(12) United States Patent
Inamdar

(10) Patent No.: US 7,281,242 B2
(45) Date of Patent: Oct. 9, 2007

(54) FLEXIBLE AND EXTENSIBLE JAVA BYTECODE INSTRUMENTATION SYSTEM

(75) Inventor: Rajendra Inamdar, N. Chelmsford, MA (US)

(73) Assignee: BEA Systems, Inc., San Jose, CA (US)

( * ) Notice: Subject to any disclaimer, the term of this patent is extended or adjusted under 35 U.S.C. 154(b) by 620 days.

(21) Appl. No.: 10/287,213

(22) Filed: Nov. 4, 2002

(65) Prior Publication Data

US 2003/0149960 A1 Aug. 7, 2003

Related U.S. Application Data

(60) Provisional application No. 60/349,457, filed on Jan. 18, 2002, provisional application No. 60/349,586, filed on Jan. 18, 2002.

(51) Int. Cl.
*G06F 9/45* (2006.01)

(52) U.S. Cl. .................. 717/158; 717/118; 717/130; 714/38

(58) Field of Classification Search ................. 717/130, 717/118, 158, 114; 714/37, 38, 39
See application file for complete search history.

(56) References Cited

U.S. PATENT DOCUMENTS

| | | | | |
|---|---|---|---|---|
| 5,452,457 A | * | 9/1995 | Alpert et al. ................ | 717/153 |
| 5,530,964 A | * | 6/1996 | Alpert et al. ................ | 717/158 |
| 5,758,061 A | | 5/1998 | Plum ........................... | 714/35 |
| 5,764,989 A | | 6/1998 | Gustafsson ................. | 717/129 |
| 5,901,315 A | | 5/1999 | Edwards ..................... | 717/124 |
| 5,946,488 A | * | 8/1999 | Tanguay et al. ............ | 717/141 |
| 6,026,237 A | * | 2/2000 | Berry et al. ................ | 717/130 |
| 6,132,109 A | * | 10/2000 | Gregory et al. ............ | 717/131 |
| 6,279,152 B1 | * | 8/2001 | Aoki et al. ................. | 717/150 |
| 6,539,539 B1 | * | 3/2003 | Larsen et al. ............... | 717/124 |
| 6,658,651 B2 | * | 12/2003 | O'Brien et al. ............. | 717/127 |
| 6,662,357 B1 | * | 12/2003 | Bowman-Amuah ......... | 717/120 |
| 6,721,941 B1 | * | 4/2004 | Morshed et al. ............ | 717/127 |
| 6,857,119 B1 | * | 2/2005 | Desai .......................... | 717/145 |
| 6,918,110 B2 | * | 7/2005 | Hundt et al. ................ | 717/158 |
| 6,968,540 B2 | * | 11/2005 | Beck et al. ................. | 717/130 |
| 6,983,455 B2 | * | 1/2006 | Kuzmin ...................... | 717/130 |
| 6,993,750 B2 | * | 1/2006 | Hundt et al. ................ | 717/130 |
| 2002/0133806 A1 | * | 9/2002 | Flanagan et al. ........... | 717/123 |
| 2003/0046663 A1 | | 3/2003 | Rogers | |
| 2004/0078684 A1 | * | 4/2004 | Friedman et al. ............. | 714/38 |

(Continued)

OTHER PUBLICATIONS

The Design and Evolution of C++, Bjarne Stroustrup, Chapter 18, The C Preprocessor, Mar. 9, 1994.*

(Continued)

*Primary Examiner*—Todd Ingberg
(74) *Attorney, Agent, or Firm*—Fliesler Meyer LLP

(57) ABSTRACT

Code can be injected into a compiled application through the use of probes comprised of instrumentation code. Probes can be implemented in a custom high level language that hides low level instruction details. A directive file contains instructions on injecting a probe into a compiled application. An instrumentation engine reads these instructions and injects the probe into the compiled application at the appropriate injection points. Multiple probes can be used, and can be stored in a probe library. Each probe can inject code into the application at, for example, a package, class, method, or line of the compiled application. Calls can also be made to external runtime libraries.

28 Claims, 2 Drawing Sheets

U.S. PATENT DOCUMENTS

2004/0205550 A1* 10/2004 Gerken ................ 715/513

OTHER PUBLICATIONS

Techniques for Obtaining High Performance in Java Programs, Iffat H. Kazi et al, ACM Comupting Surveys, vol. 32 No. 3, Sep. 2000, pp. 213-240.*

Optimizing an ANSI C Interpreter with Superoperators, Todd A. Proebsting, ACM, 1995, pp. 322-332.*

A Framework for Reducing the Cost of Instrumented Code, Matthew Arnold et al, ACM, 2001 pp. 168-179.*

"EPCC-SS99-05 Java OpenMP", Mark Kambites, May 1999, 25 pages.*

"Dynamic Class Loading in Java virtual Machine", Sheng Liang et al, ACM, 1998, pp. 36-44.*

"The Java Syntactic Extender (JSE)", Jonthan Bachrach et al, ACM, 2001, pp. 31-42.*

"The Application of JavaCC to Develop a C/C++ Preprocessor", Giancario Succi et al, ACM, 11 pages 1999.*

U.S. Appl. No. 10/287,185, filed Nov. 4, 2002, Inamdar.

* cited by examiner

FLEXIBLE AND EXTENSIBLE JAVA BYTECODE INSTRUMENTATION SYSTEM

CLAIM OF PRIORITY

This application claims priority to U.S. Provisional Patent Application No. 60/349,457, filed Jan. 18, 2002, entitled "FLEXIBLE AND EXTENSIBLE JAVA BYTECODE," as well as Application No. 60/349,586, filed Jan. 18, 2002, entitled "PROBE DESCRIPTION LANGUAGE," each of which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 10/287,185 entitled "Probe Description Language," by Rajendra Inmdar, filed concurrently herewith.

FIELD OF THE INVENTION

The invention relates generally to inserting code into applications.

BACKGROUND

During the life cycle of a software application, there is often a need to observe how the application is behaving as it executes under typical running conditions. During the development phase, program behavior can be observed using a debugger. It is not always practical to use a debugger, however, as stopping a program at a break point can change the behavior of a program, especially in multi-threaded programs. Thus, placing traces in a program can sometimes be the only option.

Inserting debugging or tracing code in the source code of a program or application can have certain drawbacks. If debugging code is inserted in several places throughout an application, the source code can become cluttered with debug logic. Also, a programmer will have to anticipate the correct places to put the debug code when inserting it into the application. Once compiled, such debugging code cannot be changed. This can be undesirable while dealing with publicly-released software.

If a problem is reported against a specific release of a product, for example, the customer support staff may have to perform several tasks to put the required diagnostic code into the application. First, it is necessary to get an exact copy of the source code from which the released product was built. Then, diagnostic logic must be manually inserted at appropriate places in the source code. The application then needs to be built in exactly the same manner in which the released product was built. If the added diagnostic code needs any further tuning, it may need to be changed by hand and the whole application rebuilt. This process can be very tedious and time consuming.

If the problem is in a third party library or module, the source code may not be available at all. In this case, altering the source code to add diagnostic logic is simply not possible.

BRIEF SUMMARY

Although described with respect to compiled Java applications, it will be appreciated that similar advantages of application visibility, as well as other advantages, may obtain in other applications of the present invention. Such advantages may become apparent to one of ordinary skill in the art in light of the present disclosure or through practice of the invention.

It is an object of the present invention to aid in the development, testing, and analysis of software applications.

It is further an object of the present invention to create a tool that allows a user to analyze an application without having access to source code.

It is further an object of the present invention to create a tool that allows a user to analyze an application without placing any instrumentation code in the application.

It is further an object of the present invention to gain visibility into the working of applications, and allow that visibility to vary by user.

It is further an object of the present invention to be able to recreate problems in a typical execution environment, while in a testing or troubleshooting environment. It may be desirable to be able to observe micro level behavior without having to change the original source code.

It is further an object of the present invention to create a tool that allows a user to control a granularity of instrumentation.

It is further an object of the present invention to create a tool that provides a user with a rich set of instrumentation primitives, which can be applied at various levels.

It is further an object of the present invention to create a tool that allows a user to provide user-specific instrumentation code that satisfies certain constraints.

It is further an object of the present invention to create a tool that allows a user to analyze an application without altering program semantics.

It is further an object of the present invention to create a tool that allows a user to analyze an application while allowing the code instrumentation to retain symbolic information.

It is further an object of the present invention to create a tool that is light-weight in terms of usage as well as execution overheads.

A system and method in accordance with one embodiment of the present invention can inject code into a compiled application. A probe containing instrumentation code can be used containing the instructions to be injected into the application. The probe can be written in a high-level language that abstracts complexity away from the user. A directive file can be used that contains instructions on injecting the probe into the compiled application, such as which injection points in the application should receive the probe. An instrumentation engine can read the instructions from the directive file and inject the probe into the compiled application accordingly. The system and method may utilize multiple probes, which may be contained in a probe library. Each probe can inject code into the application at, for example, a package, class, method, or line of the compiled application. Calls can also be made to external runtime libraries in order to implement additional functionality.

Other features, aspects, and objects of the invention can be obtained from a review of the specification, the figures, and the claims.

DETAILED DESCRIPTION

Figure 1:
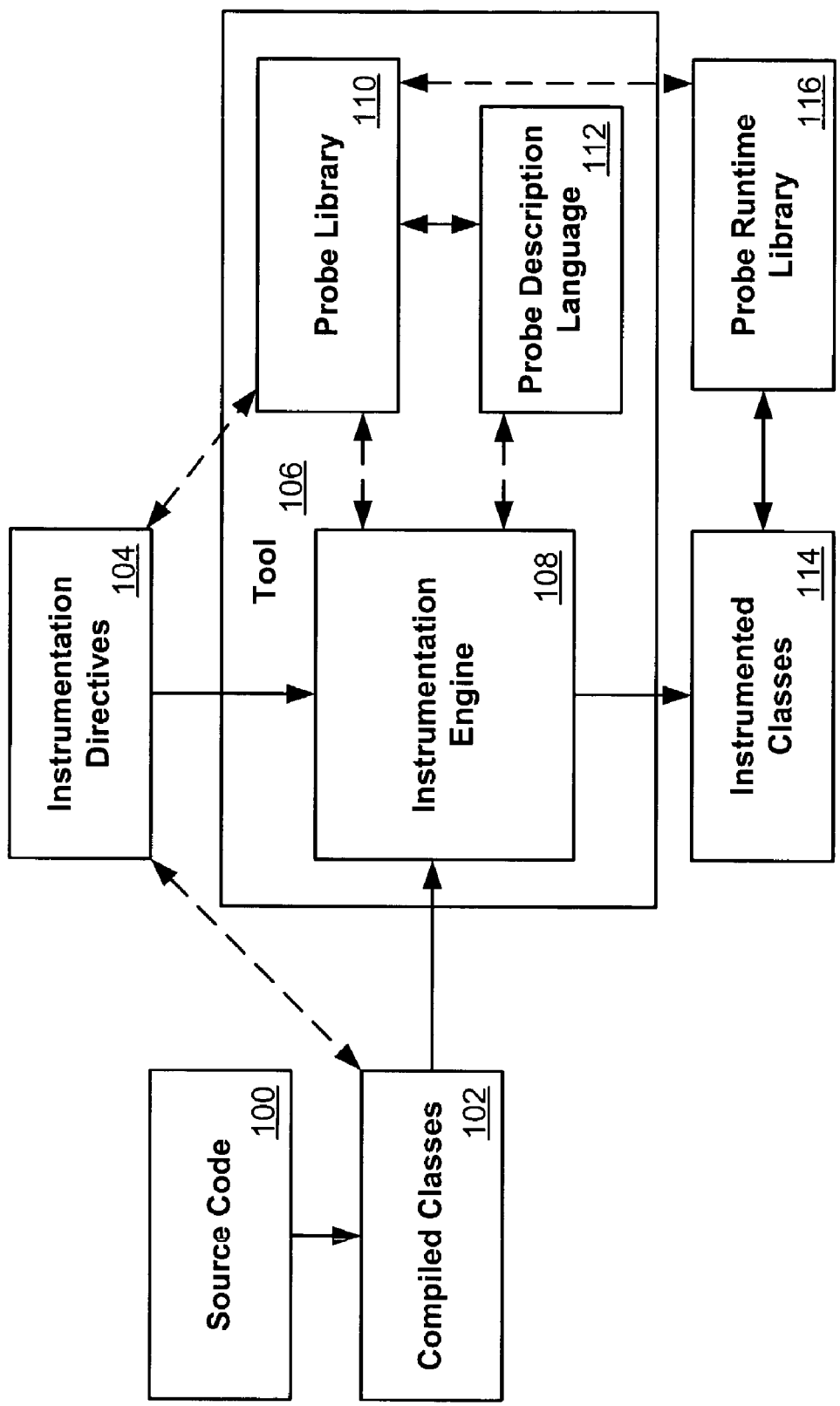
FIG. 1 is diagram of a system in accordance with one embodiment of the present invention.
Figure 2:
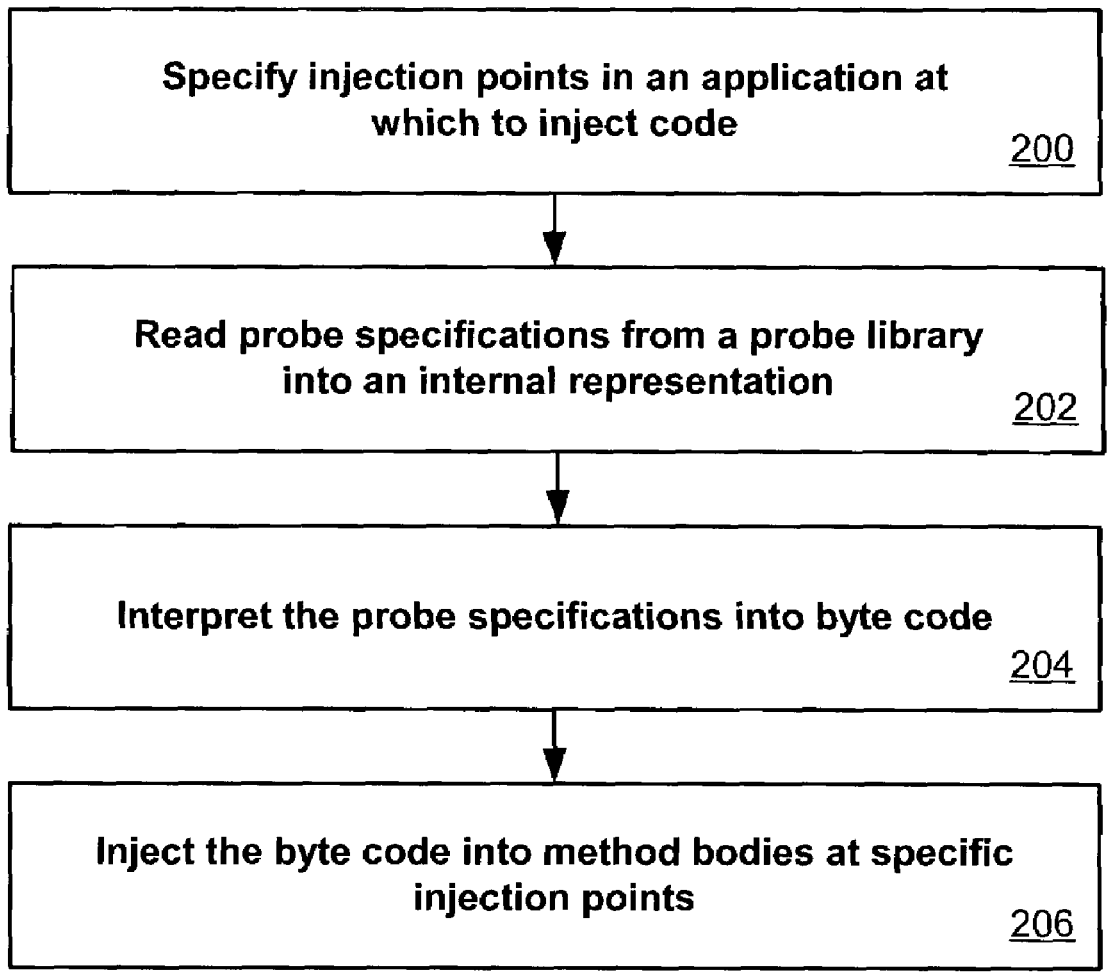
FIG. 2 is a flowchart showing steps of a method that can be used with the embodiment of FIG. 1.

Embodiments of tools that can be used in accordance with one embodiment of the present invention can provide a flexible and extensible mechanism for injecting instrumentation code into compiled Java applications. A user can also implement necessary or "arbitrary" functionality at "arbitrary" injection points in the applications. These embodiments can work directly on compiled Java classes and libraries, such that access to the original source code is not needed.

Tools in accordance with the present invention can utilize "probes", or units of programmable instrumentation code that can be injected at requested locations. The locations at which probes are to be injected are referred to as "injection points." A collection of probes can be implemented through a probe library. A "directive file" can be used by an end user to direct the application instrumentation process.

With the help of a directive file, a user can control the location(s) where the probes are injected. The user can control the scope of probe injection to packages, classes, methods, and lines corresponding to original source by specifying directives in the directive file.

Tools in accordance with embodiments of the present invention can be used in scenarios such as debugging, application tracking, and performance monitoring. One benefit of such a tool is that the tool can include a simple user interface, as the instrumentation procedure can be controlled with a simple configuration file. Such a tool can also be lightweight, as only classes specified by the user are implemented. A tool can also be extensible, as a user can create new probes as they are needed. Probe specifications can be written at a high level, such that the person creating a probe does not have to deal with low-level byte code details. A tool can also allow the invoking of arbitrary Java runtime classes and methods in the probe body.

A tool in accordance with the one embodiment of the present invention acts as a tool to inject "arbitrary" code into an application, such as into compiled Java classes, under user direction. By inserting instrumentation code after compilation, certain benefits can be obtained. One benefit arises in the fact that program source code can be kept free of debugging code clutter. Also, the locations at which debugging code is inserted into the application can be controlled by the user. This allows the placement of instrumentation to be easily changed. The instrumentation code to be inserted at specified instrumentation points can also be controlled by the user. The code can be specified using a high level, special purpose language. This language can hide any low level details about the byte code from the user.

Such a tool can provide a generic and flexible way to inject arbitrary instrumentation probe code into compiled Java classes. The tool allows the user to control the granularity at which instrumentation probes are to be inserted. The scope can be limited to a group or groups of classes. Also, within the scope of eligible classes, a user can limit the methods into which probes are to be inserted.

Apart from controlling where probes are to be inserted, a user can specify that which defines a probe body. A tool in accordance with one embodiment of the present invention can utilize a simple high level language, such as a Probe Description Language (PDL). Probe specifications can be created in PDL, such that a probe developer can be shielded from low level details about byte code. PDL can, for instance, allow Java objects to created and used from the probe body with a syntax similar to Java.

PDL can be used to develop and implement a set of probe libraries. Since the probe body can create Java objects and invoke methods on these objects, as well as on other runtime classes, it is possible to create a wide variety of probes for specific needs. Once a probe library is developed, the library can be reused or used by others.

In one embodiment, an end user will typically use already-existing probe libraries, as commonly needed probes can be supplied with the tool. Simply knowing how to use the tool should suffice for such users. If a custom probe needs to be created, the user person creating the probe may need to know PDL, or at least how to use a tool or interface that is capable of creating a probe using PDL.

In one embodiment, a tool is driven by a global configuration file and a directive file. The global configuration file can be used to store global parameter values. Global parameter values can be replaced or supplemented by variables in the directive file. The global configuration file may be seldom changed by the end user, if changed at all. A directive file can be created by an end user for a specific instrumentation session. Together, these files can identify the available probe libraries and the classes to be instrumented. The files can also identify the probes that are to be applied to selected methods within eligible classes.

The insertion of selected probes into selected methods can be performed by an instrumentation engine 108, as shown in FIG. 1. In this figure, the source code 100 is shown for illustration purposes and is not actually needed by the tool 106. Once an application is compiled, the compiled classes 102 can be used as inputs to the tool 106.

The dotted lines in the Figure are meant to demonstrate reference lines, while the solid arrows show information flow. The compiled classes 102 and instrumentation directives 104 are used as inputs to the instrumentation engine 108. The instrumentation directive 104 refers to the probes created within the probe library. The probe library 110 is written in PDL. The instrumentation engine 108 can interpret PDL, so once the probes are specified in the instrumentation directive(s) the instrumentation engine 108 can take a specified probe, find out what the probe's instrumentation is in PDL, and inject it at the specified place(s).

The user interface to this tool is the instrumentation directive 104. An instrumentation directive can be implemented as a simple text file written in XML. The file can tell the tool 106 which classes or sets of classes are to be implemented. The file can specify the granularity at which the instrumentation is applied, such as for example at certain line numbers within a method. The file can also specify several directives that inform the tool of which calls are to be applied, such as calls that apply pieces of code into an application as probes. The directives can specify which probes are to be applied at which locations. The tool can determine from the directive file which probes to apply and where to apply them.

The tool 106 itself contains the instrumentation engine 108, a probe library descriptor 110, and the PDL 112. The PDL block is a phantom component, as it is part of the tool and not actually a separate entity. The instrumentation engine 108 is a general purpose injection engine that can interpret information given in an instrumentation directive 104. The probes can be contained in a probe description library 110, which can be deployed as part of the tool 106. The libraries themselves can be created in PDL.

The code to be injected into the instrumented classes of the application can be extracted out of the instrumentation engine 108 itself. The engine can provide generic mechanisms to define that which the user wants to inject. The engine can allow the user to create probes with arbitrary implementations. The instrumentation engine 108 can also inject probes into the instrumented classes 114 from a probe runtime library 116.

Even though a user does not have access to source code, the user can identify several components of an application to be used with the tool. For example, a user can know which classes make up an application. Since everything is contained in class files, a user can easily determine the class names. A user can know at least this amount of information about an application. A user can then, for example, instrument all these classes across the board.

Another possibility is that a user can determine methods in those classes before or after the classes are instrumented. For example, if a user injects probes that will do program tracing, the user can learn about the methods of the program while the program is executing. The tool can, for example, print out all methods being instrumented in a class. A user can then selectively instrument the methods, and so on.

When instrumenting a method a user can accomplish various tasks, such as instrumenting an application so that when it executes it will print method entries, exits, and arguments. A user can create probes or use probes from a library that will accomplish those tasks. When a probe is inserted, there will be some code that is injected, for example, at method entry and method exit.

A user can also make calls to other external run-time libraries, such as to get performance data. A probe can identify time stamps and individual milestones in a method or application, can compute the differences between the timestamps, and can print out elapse times. The tool allows users to make calls to external run-time libraries which can implement arbitrary functionality.

An instrumentation engine can compile the probe specifications in probe libraries into an internal representation. The instrumentation engine can then interpret the probe code to inject appropriate byte code into method bodies at appropriate places. An instrumentation engine can provide a framework for injecting instrumentation probes into compiled Java classes. An instrumentation engine can create instrumented class files from input class files, and can read and compile probe specifications from probe libraries. An instrumentation engine can identify and read byte code for classes specified by user directives, and can identify injection points within classes specified by the user. An injection engine can identify probes to be injected into specified classes and can inject probe instrumentation code into classes at appropriate injection points. The injected code can be generated by compiling probes within the context of an injection point.

Global configuration information can be stored in a global configuration file, which can have the a format similar to that of the following examples.

```
            Global Configuration File Example #1
<?xml version="1.0" encoding="UTF-8"?>
<DOCROOT>
      <GLOBAL_OPTIONS>
          <OPTIONS>
              <OPTION name="optname" value="optvalue" />. . .
          </OPTIONS>
          <PROBE_LIBS>
              <PLIB prefix="prefix-name" value=
                 "probe-library-path" />. . .
          </PROBE_LIBS>
          <EXCLUDE_PATTERNS>
              <PATTERN value="class-name-pattern" />. . .
          </EXCLUDE_PATTERNS>
          <SAFE_VALUES>
              <PATTERN value="class-name-pattern" />. . .
          </SAFE_VALUES>
      </GLOBAL_OPTIONS>
</DOCROOT>
            Global Configuration File Example #2
<?xml version="1.0" encoding="UTF-8"?>
<DOCROOT>
     <GLOBAL_OPTIONS>
         <OPTIONS>
             <OPTION name="TRACE" value="DEBUG" />
             <OPTION name="OUTDIR" value="output" />
             <OPTION name="itool.runtime.path" value
                ="c:/weblogic/lib/log4j.jar" />
         </OPTIONS>
         <PROBE_LIBS>
             <PLIB prefix="log4j" value="log4.pdl" />
             <PLIB prefix="jsr47" value="jsr47.pdl" />
         </PROBE_LIBS>
         <EXCLUDE_PATTERNS>
             <PATTERN value="Java.*" />
             <PATTERN value="javax.*" />
         </EXCLUDE_PATTERNS>
         <SAFE_VALUES>
             <PATTERN value="java.lang.*" />
             <PATTERN value="java.util.*" />
         </SAFE_VALUES>
   <GLOBAL_OPTIONS>
</DOCROOT>
```

In a global configuration file similar to that shown above, an OPTIONS element can be empty or can include a number of OPTION elements. Each OPTION element can specify a global parameter. The "name" attribute of the OPTION element can identify the name of the parameter and the "value" attribute can identify its value. A global parameter specified in the global configuration file can be over ridden by a corresponding OPTION element in a directive file. It can be further over ridden by a command line option.

Certain global parameters can be used by the tool. One such parameter is TRACE. A TRACE parameter can be used to specify the tracing level to be used. Possible values include DEBUG, INFO, WARN, and ERROR. The WARN value can be set as the default. Another such parameter is OUTDIR, which can be used to specify the output root directory where instrumented classes can be created.

Another possible global parameter is itool.class.path. This parameter can specify the class path used to locate classes to be instrumented. If not specified, the parameter can default to a CLASSPATH environmental variable.

An itool.runtime.path variable can specify the class path used to locate runtime classes which will be used from the instrumentation code. If not specified, the variable can default to the CLASSPATH environmental variable. Parameter values for itool.class.path and itool.runtime.path can be specified in the same format that of a typical CLASSPATH environmental variable.

Another element that can be included in a global configuration file is PROBE_LIBS. A PROBE_LIBS element can be empty, or can include a number of PLIB elements. A prefix attribute can be used to specify the name-space for the probe library. When using a prefix attribute, the names of all probes in the probe library can be prefixed with a specified prefix. The value attribute can specify the path to the probe library file. The probe library file can contain specifications to a group of instrumentation probes. A list of available probe libraries can be supplemented with PLIB elements in the directive file.

An EXCLUDE_PATTERNS element in the global configuration file can be empty or can include a number of PATTERN elements. Each PATTERN element can specify a pattern used to exclude classes from the instrumentation process. A list of exclusion patterns can be supplemented with EXCLUDE_PATTERNS in the directive file.

A PATTERN element can specify the pattern to be used for matching strings. It can have many attributes, such as a TYPE attribute. When present, TYPE can have a value such as for example "re", allowing the pattern specified by the "value" attribute to be taken as a Perl regular expression. Otherwise, it can allow for limited wild card specification. The VALUE attribute can specify the pattern to be used for string matching. If TYPE's attribute value is not "re", it can specify an exact match or start string if the pattern ends in "*". For example:

```
<!-- Matches all classes starting with "com.foo." -->
<PATTERN type="re" value=" com.foo.\." />
<!-- specified as Perl regular expr. -->
<PATTERN value="com.foo.*" />
<!-- equivalent to above. -->
<!-- Matches com.foo.MyClass only -->
<PATTERN type="re" value=" com\.foo\.Myclass$" />
<!-- specified as Perl regular expr. -->
<PATTERN value="com.foo.Myclass" />
<!-- Matches com.foo.MyClass only -->
```

Another possible element in a global configuration file is SAFE_VALUES. There can be any number of PATTERN elements under a SAFE_VALUES element, or the element can be empty. Each pattern can specify the class names whose "toString" method can be safely used within inserted instrumentation code. The list of "safe" classes can be supplemented with SAFE_VALUES element in the directive file.

PDL can allow probe code to invoke methods on objects such as Java objects. If those methods are instrumented themselves, they can lead to undesirable consequences in certain circumstances, such as infinite recursion or infinite loops. The SAFE_VALUES is a hint that it is OK to invoke methods on these classes and objects of these classes. This issue will be covered in more detail later in this document.

Directive File

A directive file can be used to specify which probes are to be inserted into which class files. A directive file can limit the scope of instrumentation to a group of classes. Additionally, a directive file can provide a section such as GLOBAL_OPTIONS to replace or supplement information specified by a global configuration file.

A directive file can define an itool.runtime.path to identify runtime classes. The directive file can also define an itool.class.path to identify classes to be instrumented, and can define patterns to include or exclude classes from the instrumentation process. A directive file can register probe libraries and specify directives to inject named probes into named classes. A sample directive file is shown below.

Directive File Example #1

```
<?xml version="1.0" encoding ="UTF-8"?>
<DOCROOT>
<!--
global options replace/supplement values
specified by global configuration file
-->
    <GLOBAL_OPTIONS>
        <OPTIONS>
            <OPTIONS name="optname" value="optvalue" />. . .
        </OPTIONS/>
        <PROBE_LIBS>
            <PLIB prefix="prefix-name" value="probe-library-
                path" />. . .
        </PROBE_LIBS>
        <EXCLUDE_PATTERNS>
            <PATTERN value="class-name-pattern" />. . .
        </EXCLUDE_PATTERNS>
        <SAFE_VALUES>
            <PATTERN value="class-name-pattern" />. . .
        </SAFE_VALUES>
    </GLOBAL_OPTIONS>
<!--
An instrument spec identifies the classes to which a set of probes
need to be applied.
-->
<INSTRUMENT_SPEC>
    <INCLUDE_PATTERNS> <!-- apply probes in this spec only to
        classes below -->
```

-continued

```
            <PATTERN value="class-name-pattern" />. . .
        </INCLUDE_PATTERNS>
        <EXCLUDE_PATTERNS> <!-- within this spec, exclude these
classes
            from instrumentation -->
            <PATTERN value="class-name-pattern" />. . .
        </EXCLUDE_PATTERNS>
        <APPLY_PROBES> <!-- apply following probes to eligible
            classes in this spec -->
            <PROBE name="probe-name"
                method_type="method-type"
                    pattern_type="pattern-type"
                    include_methods="method-patterns"
                    exclude_methods="method-patterns"
                    probearg="probeargval" . . .
                /PROBE>. . .
        </APPY_PROBES>
    </INSTRUMENT_SPEC> . . .
</DOCROOT>
                    Directive File Example #2

<?xml version="1.0" encoding="UTF-8"?>
<DOCROOT>
    <GLOBAL_OPTIONS>
        <OPTIONS>
            <OPTION name="TRACE" value="debug" />
            <OPTION name="itool.class.path"
                value="C:/weblogic/classes" />
        </OPTIONS>
        <PROBE_LIBS>
            <PLIB prefix="log4j" value="log4j.pdl" />
        </PROBE_LIBS>
        <EXCLUDE_PATTERNS>
                <PATTERN value="org.apache.*" />
            </EXCLUDE_PATTERNS>
    </GLOBAL_OPTIONS>
    <INSTRUMENT_SPEC>
        <INCLUDE_PATTERNS>
            <PATTERN value="com.beasys.engtools.webcli.*" />
            <PATTERN value="com.beasys.engtools.util.*" />
        <INCLUDE_PATTERNS>
        <EXCLUDE_PATTERNS>
            <PATTERN value=
            "com.beasys.engtools.webcli.properties.*" />
        </EXCLUDE_PATTERNS>
        <APPLY_PROBES>
            <PROBE name="methodEntry" include_methods"*"/>
            <!-- note how the String value of label is passed -->
            <PROBE name="printExpr" lineno="100-110"
                label=""Object-Name: "" expr="objName" />
        </APPY_PROBES>
    </INSTRUMENT_SPEC>
</DOCROOT>
```

An INSTRUMENT_SPEC element in the directive file can direct how the instrumentation should be performed. Each INSTRUMENT_SPEC element can specify the classes to which instrumentation is to be applied. The element INSTRUMENT_SPEC can contain one or more PROBE elements, which specify the probe(s) to be applied to eligible class(es). The specified probes can be applied to classes listed in an INCLUDE_PATTERNS element, which are not in any EXCLUDE_PATTERNS in the global options or in EXCLUDE_PATTERNS of the current specification. A directive file can have multiple INSTRUMENT_SPEC elements.

A PROBE element can specify the probe to be applied to eligible classes. It can have attributes such as NAME, which can be a required attribute to specify the name of the probe, which exists in one of the specified probe libraries.

If a pattern_type attribute exists, it can have a value such as "re". If the value is "re", patterns used in include_methods and exclude_methods are Perl regular expressions. This is similar to what is described with respect to the TYPE attribute in PATTERN elements. This attribute is optional in some embodiments.

A method_type attribute can be used to identify the type of methods within eligible classes to which a probe should be applied. This attribute, which can be optional, can include a list of values such as, for example:
constructor: can be applied to class constructors
private: can be applied to private methods
protected: can be applied to protected methods
public: can be applied to public methods
all: can be applied to all methods An include_methods attribute can specify comma-separated patterns, in order to identify methods to which the probe is to be applied. If this attribute is not included, all methods can be eligible. An exclude_methods attribute can also be included to identify methods which should be excluded. If this attribute is not included, no methods will be excluded.

A "lineno" attribute can be specified, for example, when the probe scope is %online. The value of lineno can specify the line number in the original source where the probe is to be applied. The value specified can be a number, such as 100, or a range, such as "100-110." A value of "*" can be used to imply that the probe is to be applied at all lines in the eligible method.

When the probe scope is %oncall, a "callsite" attribute can be specified. The value of callsite can specify the pattern to identify call sites at which the probe will be applied. For example, setting callsite="read" can apply the probe at the call to method "read" within the scope of the method being instrumented.

A probe can have zero or more arguments. When a probe has arguments, the arguments can be specified with a statement such as ProbeArg="ProbeArgVal". The name of the attribute should match with the name of the probe argument.

Within an eligible class, a probe can be applied to those methods which satisfy restrictions placed by attributes such as method_type, include_method and exclude_method. In one embodiment, if the method name matches patterns specified in exclude_methods, the probe is not applied. If the method name does not match patterns specified in include_methods, the probe is not applied. If the method type is not present in the method_type attribute, the probe is not applied.

More than one probe can be applied to the same method in a class, due to, for example, multiple PROBE elements within the same INSTRUMENT_SPEC element or due to multiple INSTRUMENT_SPEC elements within the directive file.

Principle of Operation

A high level description of the operation of a tool in accordance with one embodiment of the present invention is as follows. A directive file is parsed to obtain certain information, such as a list of class archive libraries and directories containing compiled classes to be instrumented. A list of classes specifically excluded from the instrumentation process is also parsed, as well as libraries of probes which are available for instrumentation. A list of instrumentation specifications is obtained, comprising a subset of classes which should be considered for instrumentation within the scope of the instrumentation specification. The list of specifications can also include classes to be specifically excluded from instrumentation within the scope of the instrumentation specification, and a list of probe directives, used to apply probes from available probe libraries which are to be injected in eligible classes. The probe directives can further restrict the classes, methods within the classes, and locations within the methods where the probe can be applied. There can be multiple instrumentation specifications, and each instrumentation specification can define different class subsets which are eligible for instrumentation within the scope of the instrumentation specification.

For each class archive library and directory containing compiled classes, valid class files can be identified as well as their fully qualified class names. For each probe library available for instrumentation, the probe library file can be parsed, and probes defined in the probe library can be identified. Parsed trees can be stored for defined probes in the probe repository.

For each identified class, the tool will determine if that class is explicitly excluded or is an interface, and will skip all such classes. For each executable method in the class, a list of eligible probe directives can be identified which are to be applied to this method in the class, obtained from the list of probe directives identified for all instrumentation specifications. For each eligible probe directive identified, a copy of the parsed representation of the specified probe can be obtained from the probe repository.

It can then be determined whether the formal probe parameters are specified in the probe directive. An "oninit" section of a probe body can specify the code to be emitted in the static class initializer after instrumentation. One purpose for doing so would be to capture some objects that might be used or re-used by different probes. If it exists, the "oninit" section can be compiled to emit code in the static class initializer. An "oninit" section can create a reusable static object, which can be available once the class loads. The static initializer can execute when the class is being loaded. Thereafter, everything that is being created and initialized can be accessed from the bodies of the different probes.

An "onentry" section of a probe body can specify code to be emitted at method entry. If it exists, the probe formal parameters can be replaced with actual parameters specified in the probe directive. The "onentry" section can also be compiled to emit code at the method entry. The section can create objects and variables, and can initialize them.

An "onexit" section in the probe body can specify code to be emitted before a return from a method. If the section exists, the probe formal parameters can be replaced with actual parameters that are specified in the probe directive. All return instructions within the method can also be identified. For each return instruction within the method, the "onexit" section can be compiled within the context of the return instruction. A generated instruction sequence can be injected before the return instruction.

A "before_line" section in the probe body can specify code to be emitted before an instruction corresponding to a line in the original source code. If the section exists, the probe formal parameters can be replaced with actual parameters specified in the probe directive. All injection points can be identified that match the "lineno" attribute in the probe directive. For each injection point within the method, a "before_line" section can be compiled within the context of the injection point. The generated sequence can then be injected at applicable injection points.

A "before_call" section in the probe body can specify code to be emitted before a call to a named method. If the section exists, the probe formal parameters can be replaced with actual parameters specified in the probe directive. All injection points can be identified within the method where the named method is invoked. For each such injection point, a "before_call" section can be compiled within the context of the injection point. The generated sequence can then be injected at the injection point.

An "after_call" section in the probe body can specify code to be emitted after a call to a named method. If the section exists, the formal probe parameters can be replaced with actual parameters specified in the probe directive. All injection points can be identified within the method where the named method is invoked. For each such injection point, an"after_call" section can be compiled within the context of the injection point. A generated sequence can be injected at the injection point.

An "oncatch" section in the probe body can specify code to be emitted at the beginning of a catch block. If the section exists, formal probe parameters can again be replaced with actual parameters specified in the probe directive. All injection points involving catch blocks can be identified. For each injection point, the "oncatch" section can be compiled within the context of the injection point. A generated sequence can then be injected at the injection point.

If any applied probe has an "oninit" section and the class does not have a static initializer method, a static initializer method can be created. Generated initialization code can be injected into the static initializer method. The modified class can then be saved to a designated location.

Certain users should be able to create probes in PDL for specific needs. For example, a library of probes can be created by a user to perform specific tasks, such as application tracing and logging. A separate library can be created for performance measurements, such as might make use of suitable runtime libraries. Libraries of such probes can be created and shared among end users. Since PDL hides details about low level bytecode and class manipulation facilities, it can be very easy for a user to maintain and adapt created probes. A tool in accordance with one embodiment of the present invention can also be extended and integrated with other programs, such as integrated development environments, in order to enhance usability.

Probe Description Language

A custom language such as the Probe Description Language (PDL) can provide a high level notation to specify the body of an instrumentation probe. It can be implemented as a special purpose language that allows invoking methods on Java classes and objects. PDL can be used to write probe libraries, for example.

PDL is a language that can be, in one implementation, very close to Java, although high-level languages abstracting away the complexity of other languages can be implemented in a similar fashion using the teachings included herein with respect to the Java language. In a Java-based embodiment, some of the semantics are the same as Java, such as the semantics used to call methods. This lessens the learning curve needed to understand and use PDL if a user knows basic Java commands. PDL can link classes, objects, and methods in the Java world. For example, in the environment for such a tool a user may need to specify which pieces of code will end up where, such as when a user wants to inject something at method entry and something else just before method exit as part of the same probe.

PDL can also provide certain keywords, such as may be useful in computing certain information. For example, a user can use keywords to determine which class is currently running in an application. A user can also determine the current method being instrumented or the current line number. Certain features can be included that are tailored toward expressing the type of information that the user would like to evaluate as part of the probe.

PDL can provide a mechanism to describe instrumentation code. PDL can support the use of Java primitive types, as well as user-specific types. PDL can support simple arithmetic operations and string catenation. PDL can allow the creation of static objects and variables, as well as objects and variables on stack. PDL can allow calls to external Java runtime library methods and the creation of parameterized probes.

PDL can provide constructs to allow a probe writer to declare and instantiate variables of any Java type in the class static initializer. PDL can also allow a probe writer to declare and instantiate variables of any Java type on the stack. PDL can also allow for arithmetic operations. Literal values of Java primitive types can be defined and utilized, as well as literal String values. PDL can allow for string concatenations, and can provide access to classes, objects, and variables within an application being instrumented. This approach is consistent with Java scoping and access rules. PDL can be used to invoke methods on arbitrary Java runtime classes, and can allow a probe writer to pass arguments to invoked methods. Any accessible objects and variables can be passed as arguments, whether originating from the application or created in the probe. PDL can allow for conditional execution. PDL can also allow a probe writer to create parameterized probes, such that the same probe can be used in different contexts to operate on different arguments.

PDL can support comments or comment statements, such as C++ style comments. For example, anything following a double slash, or "//", can be treated as a comment. Anything between a "/*" and a "*/", possibly following a "*", can also be treated as a comment.

In order to specify that a word is a keyword in PDL, all keywords can start with a specific symbol, such as starting with a "%" character. The keywords can also have specified meaning based on their context. Exceptions can include Java primitive types such as "int" and "long". Following are keywords and possible meanings for one embodiment of the language. The primary data types in this embodiment are byte, char, short, int, long, float, double, and boolean.

%pdl—probe description library
%probe—probe specification
%file—source file name corresponding to the class (java.lang.String)
%class—fully qualified class name being instrumented (java.lang.String)
%method—current method name being instrumented (java.lang.String)
%line—current line number, or line number in the original source code where the code or probe will be injected (int)
%retval—return value of the method
%argc—method parameter count
%argv—array of method parameters or arguments
%oninit—code to be emitted in static initializers
%onentry—code to be emitted at method entry
%onexit—code to be emitted at method exit
%before_line—code to be emitted before specified source line
%before_call—code to be emitted before call to specified method
%after_call—code to be emitted after call to specified method
%oncatch—code to be emitted in a catch block
%return—a method return value, can be valid only with the "onexit" section
%caught—a caught exception, can be valid only within the "oncatch" section Using keywords such as %file, %class, %method, %line, and %retval in the probe body can yield corresponding values of type java.lang.String. These strings can participate in string concatenation to form other relevant strings. These keywords can also be combined with other variables and literal values and passed to appropriate runtime methods for further processing. The syntax and semantics of PDL can also be extended by a sufficiently skilled probe writer.

PDL need not impose restrictions on which Java classes and methods can be invoked within the probe code. Therefore, it can be possible to invoke arbitrary runtime classes to implement arbitrary functionality.

During an instrumentation process, probe sections can be compiled and generated code can be injected at designated injection points. Appropriate syntactic and semantic analysis can be performed within the context of each injection point to ensure that the probe body is valid within the context of each injection point. If such checks fail, an appropriate message can be printed and the probe kept from being injected.

Probes can be created to accept parameters. A specific instance of a probe directive using such a probe would pass the actual parameters as named attributes. Formal parameters can be replaced with acutal parameters while processing a probe directive at every probe injection point. This feature can allow the creation of generic probes which will inject appropriate code, based on the passed parameters.

The following example illustrates how a probe can be written to print the value of an expression at a given line.

```
%probe printExprAtLine (label, expr)
{
    %before_line
    {
        java.lang.System.out.println(
            ((  ("IVT printExprAtLine " +
                %class + " : : " + %method +
                " @Line " + %line + " ") +
                label) + expr)
        );
    }
}
```

Multiple probes can be written in a single file to create a probe library. Multiple probe libraries can be created and made available to the system for application instrumentation.

A user can inject specific probes at specific locations by creating a directive file. A directive file can be implemented as a simple XML file. Elements within the directive file can identify the set of classes eligible for instrumentation, the set of classes to be executed for instrumentation, the set of probe libraries available, and the list of probes to be injected in eligible classes at eligible locations.

A PDL program can specify a probe library. One example of the form of a PDL program, or probe library, is given by:

```
%pdl probe-library-name ; // identifies the probe library name
%probe probe-name ( [probe-args . . .])
{
    %oninit { stmt-list }
    %onentry { stmt-list }
    %onexit { stmt-list }
    %before_line { stmt-list }
    %before_call { stmt-list }
    %after_call { stmt-list }
    %oncatch { stmt-list }
}
```

A probe can be uniquely identified by a library name and a probe name. A probe arguments list, such as may be referred to as "probe-args", can be implemented as a comma-separated list of probe arguments. The arguments can be used within the body of the probe symbolically. For a specific probe insertion, the values of the probe arguments can be specified by the corresponding named attributes in a PROBE element of the directive file. The probe body can have one or more sections.

A probe can contain any combination of sections, but sections such as "onexit", "before_line", "before_call", "after_call", and "oncatch," described above, may need to be mutually exclusive. Each of these sections can be empty, or they can contain a number of statements. Each statement can end with a symbol such as a semi colon.

One type of statement that can be supported is a declaration. Variables can be declared using a declaration statement of the form:

type name[=initializer-expression];

All Java types can be supported, including primitive types and user types. An optional "initializer" can initialize a newly-created variable. Variables created in an %oninit section can be implicitly static. Variables created in an %onentry section can be created on the stack, and the scope of these variables can be entire method body. These variables can not be declared in other sections.

Variables declared within probes can be internally renamed using a name-altering scheme, such that the variables do not clash with variables in the application being instrumented. For example:
int index;
java.util.Vector vector=new java.util.Vector( );
long t0=100;

Another statement that can be supported in PDL is an assignment. Assignment statements can be used to assign values to variables, and can take a form such as "name=expression;" given by the example "elapsed_time= (t1−t0);" statement.

Another supported statement can be an expression. PDL expressions can support simple arithmetic operations, such as the addition and subtraction of integer types. Expressions can also support string catenation, method calls on Java classes and objects, and "new" operators to instantiate objects. An example is given by the statement "vector=new java.util.Vector( );".

Methods on Java classes, interfaces, and objects can be invoked with the same syntax as in Java. Passed parameter types can match corresponding method signatures. The tool can report an error if the parameters and signatures do not match. Values returned from such method calls can be assigned to variables of compatible types. The objects on which the methods are invoked can be probe variables, as declared in the probe, or they can come from the application being instrumented.

EXAMPLE t0=java.lang.System.currentTimeMillis( );
java.lang.System.out.println("Elapsed Time:"+(java.lang.System.currentTimeMillis( )−t0));

In some embodiments, variables can be declared only in %oninit and %onentry sections. Variables declared in an %oninit section can be implicitly static, and variables declared in an %onentry section can be created on a stack. It is also possible to not have any sections in a probe body. Such a probe can be treated as an empty probe. Access to variables from an application being instrumented can be required to satisfy normal Java scoping and access rules. Since the scope of a probe can be implicitly identified by analyzing the probe body, it may not be necessary to track the scope of a probe in the PDL syntax.

Interface

Instead of creating a directive file by hand, or creating an XML file directly, a user interface can be supplied which will help a user to generate a directive file. This can further lower the amount of knowledge required to inject probes into a compiled application.

A user interface can take the form of, for example, a point-and-click graphical user interface (GUI) or an identification tree. If using an identification tree, a user can click on nodes within the tree, with nodes representing, for example, classes and methods in the application. The user can simply select a point at which to insert a probe. Alternatively, a user can click through lists of methods and classes to select a position through a GUI, then select a probe from a list and specify parameters or options that might be needed by the probe.

Architecture Overview

As discussed above, a user input to this tool can consist of a set of compiled class files along with a file containing instrumentation directives. Input class files can be manipulated by the tool to produce functionally equivalent instrumented classes. The instrumentation directives can be written using probes from available probe libraries. The probe libraries can be created by generating probe library descriptor files in PDL. It is possible to create and deploy multiple probe libraries.

The instrumentation engine can read input class files and instrumentation directives provided by the user. The instrumentation engine can refer to the probe library descriptors to identify the instrumentation specification for the probes. Using the instrumentation specifications, the instrumentation engine can emit appropriate byte-code within the class files to produce instrumented class files.

The instrumented classes can be executed with the provided runtime library to generate runtime traces. First, the command line, global configuration, and directive file can be processed. Probe libraries can then be compiled in order to build an internal representation for all available probes. A semantic analysis of each probe specification can be completed. Eligible classes are identified for instrumentation.

For each eligible class, the class file can be read and a static initializer method created, if needed. For each method in the class, all probes can be identified which need to be applied to the method. For each probe to be applied, the probe application location is identified. Code in the static class initializer is emitted, if needed, based on the specification in the %oninit section. Code in the method body is emitted at the indicated location based on different sections in the probe body. The modified class file can then be written.

Libraries

A user can make calls from the tool to a third-party library, such as a Log4j API, in order to accomplish tasks such as logging messages into the console. Using Log4j provides a flexible way of sending messages to different destinations. A user can insert calls within the byte code and make calls to this API. A probe library can be created around this API that can be used for application tracing. The probe library can be a bridge between the application the user wants to instrument and the Log4j API. There can be a run-time library that does very specific things, such as application tracing and performance monitoring. The user can then leverage this run-time library by creating probes that make a bridge to that library. The API can be called without having to alter the source code.

INDUSTRIAL APPLICATION

Embodiments in accordance with the present invention will allow development engineers to accomplish tasks such as identifying concurrency problems and race conditions. Development engineers can also use such tools to monitor the state of a program as it executes and analyze software logic. Embodiments in accordance with the present invention will also allow performance engineers and the like to make performance measurements at the micro level and do competitive analysis. Performance engineers can also do a statistical analysis over micro level measurements to expose bottlenecks and load imbalances.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer implemented system for injecting code into a compiled application, comprising:
   a probe library containing a probe comprising instrumentation code and containing additional probes;
   a directive file containing instructions on injecting said probe into said compiled application; and
   an instrumentation engine for reading said instructions from said directive file and injecting said probe into said compiled application;
   wherein said probe contains code for executing a task selected from the group consisting of debugging, tracing, and performance modeling.

2. A computer implemented system according to claim 1, wherein said probe is adapted to inject code into at least one of a package, class, method, and line of said compiled application.

3. A computer implemented system according to claim 1, further comprising a user interface for allowing a user to create said directive file.

4. A computer implemented system according to claim 3, wherein said user interface comprises an instrumentation directive.

5. A computer implemented system according to claim 3, wherein said user interface comprises a text file in XML.

6. A computer implemented system according to claim 1, further comprising a global configuration file for storing global configuration parameters for said system.

7. A computer implemented system according to claim 1, further comprising external runtime libraries to which the user can call to implement additional functionality.

8. A computer implemented system according to claim 1, wherein said compiled application contains compiled class files, and said implementation engine is adapted to accept a compiled class file and produce a functionally equivalent instrumented class using said probe.

9. A computer implemented system according to claim 1, wherein said directive file contains instructions on where in said compiled application to inject said probe.

10. A computer implemented system according to claim 1, wherein said instrumentation engine does not leave code in the application after injecting the probe.

11. A computer implemented system according to claim 1, wherein said instrumentation engine is further adapted to remove said probe from said compiled application.

12. A computer implemented system according to claim 1, wherein said instrumentation engine is further adapted to move said probe to a different injection point in said compiled application.

13. A computer implemented tool for injecting code into compiled applications, comprising:
- a probe description language which is a high level non-Java language that allows for including Java methods and objects;
- a probe descriptor library comprising instrumentation code written in said probe description language; and
- an instrumentation engine capable of interpreting the instrumentation code and injecting the instrumentation code into a compiled application wherein said probe contains code for executing a task selected from the group consisting of debugging, tracing, and performance modeling.

14. A computer implemented system for monitoring performance of an application, comprising:
- a probe comprising instrumentation code for monitoring an application at specific injection points in an application, wherein the probe is written in a probe description language which is a high level non-Java language that allows for including Java methods and objects;
- a directive file containing instructions on injecting said probe into said compiled application; and
- an instrumentation engine for reading said instructions from said directive file and injecting said probe into said compiled application wherein said probe contains code for executing a task selected from the group consisting of debugging, tracing, and performance modeling.

15. A computer implemented system for debugging a compiled Java application, comprising:
- a probe comprising instrumentation code for debugging an application at specific injection points in an application;
- a directive file containing instructions on injecting said probe into said compiled application, wherein the directive file identifies a set of classes eligible for instrumentation, a set of classes to be executed for instrumentation, a set of probe libraries available, and a list of probes to be injected in eligible classes at eligible locations; and
- an instrumentation engine for reading said instructions from said directive file and injecting said probe into said compiled application.

16. A computer implemented system according to claim 15, wherein said probe is adapted to inject code into at least one of a package, class, method, and line of said compiled application.

17. A computer implemented system according to claim 15, further comprising a user interface for allowing a user to create said directive file.

18. A computer implemented system according to claim 17, wherein said user interface comprises an instrumentation directive.

19. A computer implemented system according to claim 17, wherein said user interface comprises a text file in XML.

20. A computer implemented system according to claim 15, further comprising a global configuration file for storing global configuration parameters for said system.

21. A computer implemented system according to claim 15, further comprising external runtime libraries to which the user can call to implement additional functionality.

22. A computer implemented system according to claim 15, wherein said compiled application contains compiled class files, and said implementation engine is adapted to accept a compiled class file and produce a functionally equivalent instrumented class using said probe.

23. A computer implemented system according to claim 15, wherein said directive file contains instructions on where in said compiled application to inject said probe.

24. A computer implemented system according to claim 15, wherein said instrumentation engine does not leave code in the application after injecting the probe.

25. A computer implemented system according to claim 15, wherein said instrumentation engine is further adapted to remove said probe from said compiled application.

26. A computer implemented system according to claim 15, wherein said instrumentation engine is further adapted to move said probe to a different injection point in said compiled application.

27. A tool for injecting code into compiled applications, comprising:
- a probe description language which is a high level non-Java language that allows for including Java methods and objects;
- a probe descriptor library comprising instrumentation code written in said probe description language; and
- an instrumentation engine capable of interpreting the instrumentation code and injecting the instrumentation code into a compiled application wherein said probe contains code for executing a task selected from the group consisting of debugging, tracing, and performance modeling wherein the directive file identifies a set of classes eligible for instrumentation, a set of classes to be executed for instrumentation, a set of probe libraries available, and a list of probes to be injected in eligible classes at eligible locations.

28. A computer implemented system for monitoring performance of an application, comprising:
- a probe comprising instrumentation code for monitoring an application at specific injection points in an application, wherein the probe is written in a probe description language which is a high level non-Java language that allows for including Java methods and objects;
- a directive file containing instructions on injecting said probe into said compiled application; and
- an instrumentation engine for reading said instructions from said directive file and injecting said probe into said compiled application wherein said probe contains code for executing a task selected from the group consisting of debugging, tracing, and performance modeling wherein the directive file identifies a set of classes eligible for instrumentation, a set of classes to be executed for instrumentation, a set of probe libraries available, and a list of probes to be injected in eligible classes at eligible locations.

* * * * *

UNITED STATES PATENT AND TRADEMARK OFFICE
CERTIFICATE OF CORRECTION

PATENT NO. : 7,281,242 B2
APPLICATION NO. : 10/287213
DATED : October 9, 2007
INVENTOR(S) : Rajendra Inamdar It is certified that error appears in the above-identified patent and that said Letters Patent is hereby corrected as shown below:

In column 19, at line 1, after "A", delete "computer implemented".

Signed and Sealed this

Eighth Day of April, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,281,242 B2 |
| APPLICATION NO. | : 10/287213 |
| DATED | : October 9, 2007 |
| INVENTOR(S) | : Inamdar |

It is certified that error appears in the above-identified patent and that said Letters Patent is hereby corrected as shown below:

On page 2, in column 1, under "Other Publications", line 2, delete "Comupting" and insert -- Computing --, therefor.

In column 1, line 28, delete "Inmdar" and insert -- Inamdar --, therefor.

In column 15, line 7, delete "acutal" and insert -- actual --, therefor.

Signed and Sealed this

Sixteenth Day of March, 2010

David J. Kappos
*Director of the United States Patent and Trademark Office*